3,637,717
NICOTINIC ACID ESTER

Eupremio Vitale, Bologna, Italy, assignor to Alfa Farmaceutici S.p.A., Bologna, Italy
No Drawing. Filed Apr. 17, 1969, Ser. No. 817,190
Claims priority, application Spain, Apr. 19, 1968, 352,933
Int. Cl. C07d 31/36
U.S. Cl. 260—295.5 R                    1 Claim

ABSTRACT OF THE DISCLOSURE

The invention is concerned with a new chemical compound, guaiacol salicylate nicotinate, which possesses analgesic activity; pharmaceutical compositions (particularly orally administrative compositions) containing the new compound and the preparation of the new compound by the reaction of guaiacol salicylate with nicotinyl chloride hydrochloride in the presence of an acid binding agent.

---

This invention relates to a new compound, pharmaceutical composition containing it, and the preparation of the new compound.

It has been proposed to prepare pharamaceutically active adducts of nicotinic acid and guaiacol but these proposed adducts suffer from the disadvantage that they are not generally suitable for oral administration in view of their bitter, burning taste.

It has now been found, according to the invention that a novel adduct of nicotinic acid, guaiacol and salicyclic acid possesses pharmaceutical activity and is relatively tasteless.

According to the invention, therefore, there is provided as a new compound, the compound of the formula

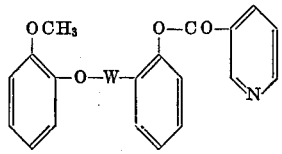

For convenience the new compound will be referred to hereinafter as guaiacol salicylate nicotinate or GSA.

GSA may conveniently be prepared by the reaction of guaiacol salicylate with nicotinyl chloride hydrochloride in the presence of an acid binding agent in accordance with the reaction scheme:

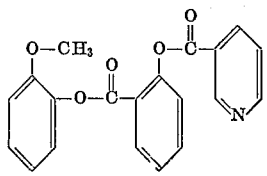

The nicotinoyl chloride hydrochloride is suitably employed in an equimolecular amount to the guaiacol salicylate or in a slight excess, e.g. an excess of about 10 mole percent. The acid binding agent is suitably an organic acid binding agent, e.g. a tertiary amine such as pyridine and the reaction is suitably carried out in the presence of an inert organic solvent such as benzene or toluene.

The guaiacol salicylate may be prepared by the reaction of guaiacol with salicylin acid with the addition of phiconyl chloride and in the presence of an inert organic solvent such as benzene or toluene. It is not necessary to isolate the guaiacol salicylate before reaction with the nicotinoyl chloride hydrochloride.

As stated above GSA possesses pharmaceutical activity and in particular possesses analgesic properties.

Accordingly, a further feature of the invention provides a pharmaceutical composition comprising GSA in association with a pharmaceutical carrier or diluent.

The pharmaceutical composition is suitably one intended for oral administration and may, for example, take the form of a solution or suspension of the GSA, which solution or suspension may, for example, be encapsulated within a gelatine capsule. Other forms of pharmaceutical composition suitable for oral administration include tablets, dragees and pills containing the GSA and dry powders comprising solid GSA diluted with a solid diluent, which powders may be in a gelatine capsule.

In order that the invention may be well understood the following example is given by way of illustration only.

EXAMPLE (a) Guaiacol salicylate (244 grams, 1 mol.) and pyridine (175 grams, 2 mols+10%) are fed into a three-nicked vessel equipped with a stirrer, a reflux condenser and a dropping-tube funnel, in the cold state. The guaiacol salicylate is dissolved in the pyridine by stirring and mild heating.

A suspension of nicotinoyl chloride hydrochloride (196 grams, 1 mol+10%) in 250 ml. of anhydrous toluene is prepared separately and is dripped into the reaction vessel drop by drop over a period of 15 minutes. The temperature of the reaction mixture is raised to boiling point, and maintained at that temperature for approximately 1½ hours.

The toluene and any excess unreacted pyridine are then distilled under reduced pressure to give a dry residue which is then removed from the flask and washed with cold distilled water until hydrogen chloride is completely removed; i.e. until the washing water is neutral. Finally, the product is dried and purified by crystallisation from tetrahydrofuran, or methylene chloride or other organic solvents.

The following yields were obtained:

(a) yield of crude product: 97%
(b) yield of crystallised product: 88%

(b) 1 mol (138 grams) of salicylic acid and 1 mol of guaiacol (124 grams) are placed in a vessel equipped with a stirrer, a reflux condenser and dropping-tube funnel, and are dissolved in 200 ml. of toluene with gentle heating.

The temperature of the reaction mixture is raised to boiling point and thionyl chloride (178 grams, 1.5 mols) is poured in drop by drop over a period of two hours.

The temperature is kept at boiling point for 12 hours, with constant stirring. The reaction mixture is then cooled, 2.2 mols (175 grams) of pyridine are fed in together with a further 150 ml. of toluene, and finally nicotinyl chloride hydrochloride (178 grams, 1 mol) in small alignots.

The temperature of the reaction mixture is then raised to boiling point, the mixture being refluxed for about 2 hours with stirring.

Excess pyridine and toluene are then distilled off under reduced pressure to give a dry residue which is then worked as described in (a) above.

Finally, the product is dried and crystallised from tetrahydrofuran or methylene chloride or other organic solvents.

The yields are obtained: following:

(a) yield of crude product: 85%
(b) yield of crystallised product: 80%.

The product has the following analysis:
Theoretical (percent): C, 68.76; H, 4.32; N, 4.01. Observed (percent): C, 68.77; H, 4.29; N, 3.95.

The product is obtained in the form of crystals or of a microcrystalline powder, which is white, odourless and tasteless and has M.P. 149–151° C.

The product is insoluble in water, soluble in concentrated acids, is of low solubility in ethyl alcohol and ether, is freely soluble in chloroform, acetone, toluene, tetrahydrofuran, dimethylformamide, methylene chloride and other conventional organic solvents.

In alcoholic solution, the product has a maximum adsorption at 268 millimicrons and a minimum absorption at 252 millimicrons. The extinction factor in ethyl alcohol is:

$$E^{1\,cm.}_{268\,millimicrons}\ 1\% = 189$$

I claim:

1. Guaiacol salicylate nicotinate of the formula:

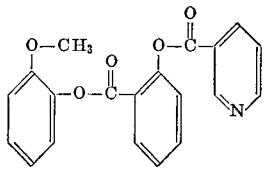

References Cited

UNITED STATES PATENTS

| | | | |
|---|---|---|---|
| 2,750,390 | 6/1956 | Fand et al. | 260—295.5 |
| 2,759,945 | 8/1956 | Anderson | 260—295.5 |

ALAN L. ROTMAN, Primary Examiner

U.S. Cl. X.R.

424—266